No. 862,829. PATENTED AUG. 6, 1907.
M. LEVIN.
BRAKE.
APPLICATION FILED MAR. 15, 1907.

Witnesses:
Geo. F. Schwarz.
Johanne Daumberger.

Inventor
Moris Levin.
By his Attorney
Max W. Ordmann.

THE NORRIS PETERS CO., WASHINGTON, D. C.

UNITED STATES PATENT OFFICE.

MORIS LEVIN. OF NEW YORK, N. Y., ASSIGNOR OF ONE-HALF TO LOUIS LUSTIG AND SOLOMON WEIL, OF NEW YORK, N. Y.

BRAKE.

No. 862,829.   Specification of Letters Patent.   Patented Aug. 6, 1907.

Application filed March 15, 1907. Serial No. 362,437.

*To all whom it may concern:*

Be it known that I, MORIS LEVIN, a subject of the Emperor of Russia, and a resident of New York, county and State of New York, have invented certain new and useful Improvements in Brakes, of which the following is a specification.

The present invention pertains to brakes for railway cars and other vehicles, and has for its object to provide a device that will allow the instantaneous operation of the brakes with great ease and efficiency.

Figure 1:
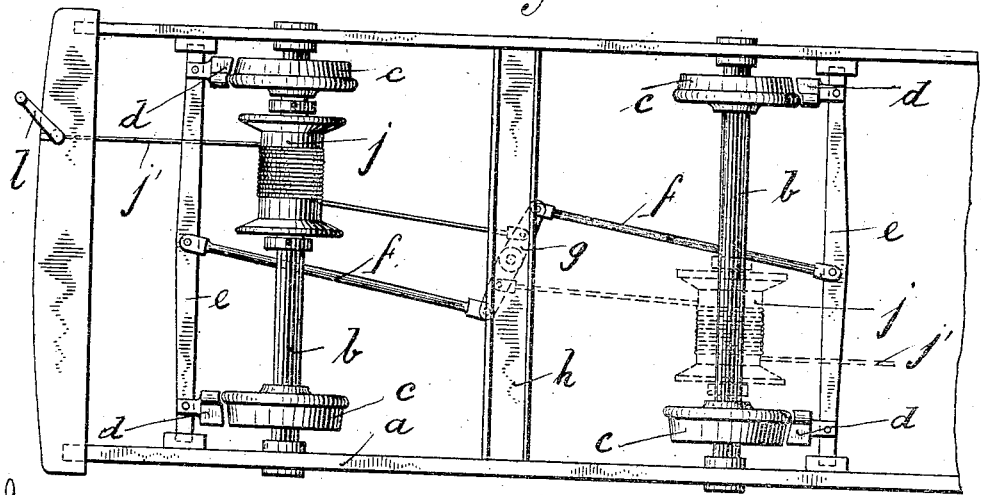
Figure 2:
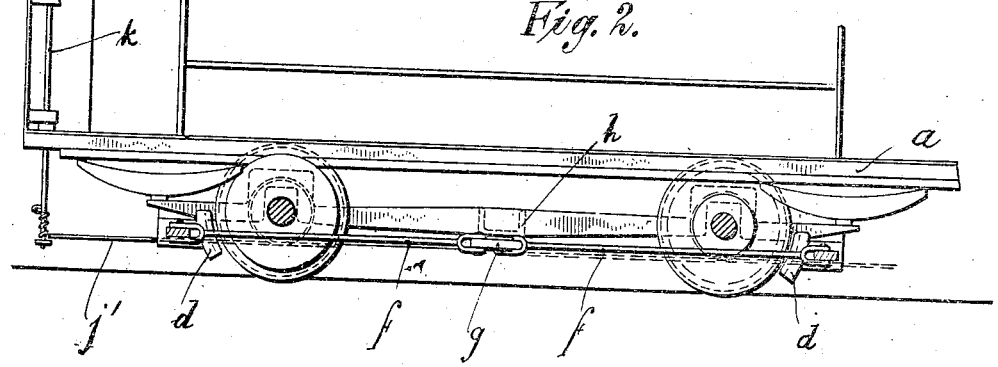
Figure 3:
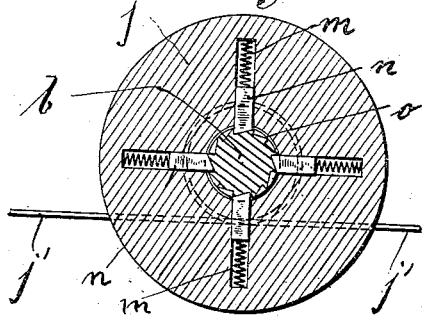
Figure 4:
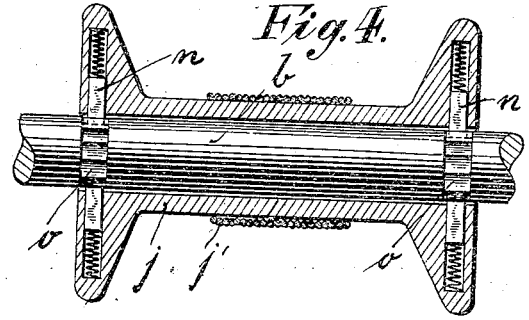

My invention is illustrated in the accompanying drawing in which similar reference letters denote corresponding parts and in which Figure 1 is a plan view; Fig. 2 a side view of the under frame of a car equipped with my device and Figs. 3 and 4 are detail views in cross section and longitudinal section respectively.

In the drawing $a$ denotes the under frame of a car, $b$, $b$ its axles, $c$, $c$ the wheels and $d$, $d$ the ordinary brake jaws.

$e$ is the bar carrying the brake jaws and pivotally connected to a rod $f$ to be operated from the swinging lever $g$ pivoted to a cross beam $h$ of the under frame. Loosely mounted on each of the axles $b$ is a windlass $j$ around which a strong rope or chain $j'$ is wound, one end of which is attached to the lower end of a vertical rod $k$ which is attached to the lower end of a vertical rod $k$ rotatively borne in the frame and carrying a handle $l$. The other end of said rope or chain is attached to the swinging lever $g$. The windlass $j$ is suitably secured on the axle against longitudinal displacement thereon, and is provided at both ends with bores $m$ extending outwards from the axle to receive spring pawls $n$ slidable therein. The axle $b$ at both ends of the windlass is provided with ratchet teeth $o$ to register with the pawls $n$ such that ordinarily, *i. e.* at the forward movement of the car or vehicle, the pawls will loosely slide over the teeth and allow of the windlass to loosely turn on the axle. To apply the brakes, it is thus only necessary to slightly turn the rod $k$ which will turn the windlass $j$ whereby the rear end of the rope will wind around the latter, drawing the bar $e$ and brake jaws $d$, $d$ towards the wheels.

When in ascending a hill, the driving power is suddenly cut off, so that the car by gravity will start to run backwards, the axle in turning in opposite direction will be caught by the pawls engaging the ratchet teeth thereof and become coupled with the windlass. The latter, in turning in opposite direction, will then automatically apply the brakes.

What I claim and desire to secure by Letters Patent is:

In a brake operating device, the combination with the axle of the car, of a brake mechanism, a windlass loosely mounted on the axle of the car, spring actuated pawls connected with said windlass and ratchet teeth in the axle, the pawls being adapted to engage said teeth during the backward movement of the car to couple the windlass with the axle, means for operating said windlass and means for connecting the latter with the brake mechanism, substantially as and for the purpose specified.

Signed at New York this 14 day of March 1907.

MORIS LEVIN.

Witnesses:
SOLOMON WEIL,
LOUIS LUSTIG.